US008347711B2

(12) United States Patent
Rice et al.

(10) Patent No.: US 8,347,711 B2
(45) Date of Patent: Jan. 8, 2013

(54) ATOM-INTERFEROMETRIC, STEPPED GRAVITY GRADIENT MEASURING SYSTEM

(75) Inventors: Hugh F. Rice, New Rochelle, NY (US); Jack C. Lindell, Plainview, NY (US); Daniel J. DiFrancesco, North Tonawanda, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1150 days.

(21) Appl. No.: 12/210,852

(22) Filed: Sep. 15, 2008

(65) Prior Publication Data

US 2010/0064767 A1    Mar. 18, 2010

(51) Int. Cl.
*G01V 7/00* (2006.01)
(52) U.S. Cl. ..................................... 73/382 R
(58) Field of Classification Search ............ 73/383, 73/382 G, 1.79, 382 R
See application file for complete search history.

(56) References Cited

U.S. PATENT DOCUMENTS

| | | | | |
|---|---|---|---|---|
| 3,630,086 A * | 12/1971 | Wilk | | 73/382 R |
| 3,731,537 A * | 5/1973 | Trageser | | 73/382 R |
| 4,992,656 A * | 2/1991 | Clauser | | 250/251 |
| 5,341,681 A * | 8/1994 | Molny et al. | | 73/382 G |
| 5,880,680 A * | 3/1999 | Wisehart et al. | | 340/853.4 |
| 6,018,302 A * | 1/2000 | Hanneman | | 340/971 |
| 6,125,698 A * | 10/2000 | Schweitzer et al. | | 73/382 G |
| 6,152,226 A * | 11/2000 | Talwani et al. | | 166/252.4 |
| 6,314,809 B1 * | 11/2001 | Kasevich et al. | | 73/382 R |
| 6,467,543 B1 * | 10/2002 | Talwani et al. | | 166/252.4 |
| 6,776,035 B2 * | 8/2004 | Wijeyesekera et al. | | 73/1.88 |
| 6,837,106 B2 * | 1/2005 | Etkin et al. | | 73/382 G |
| 7,337,668 B2 * | 3/2008 | Condemine et al. | | 73/509 |
| 2005/0004750 A1 * | 1/2005 | Huddle | | 701/200 |

* cited by examiner

*Primary Examiner* — Perter MacChiarolo
*Assistant Examiner* — Samir M Shah
(74) *Attorney, Agent, or Firm* — Kaplan, Breyer, Schwarz & Ottesen, LLP (57) ABSTRACT

A full-tensor, gravity gradient measuring system is disclosed that is based on atom interferometry. Each axis in the three-axis measuring system is served by a different gravity gradiometer, where each gradiometer comprises three pairs of atom interferometric (AI) accelerometers. The accelerometers in each pair are mounted on opposite sides of the gradiometer's rotation axis from each other. The three AI accelerometer pairs are step-rotated, instead of being continuously rotated, thereby providing enhanced signal-to-noise performance. The three gradiometers in the overall measuring system are mounted orthogonally with respect to one another on a local-level platform, in order to achieve a full-tensor measuring system. The measuring system can be step-rotated as an overall unit around an axis perpendicular to a local level reference. The multiple levels of stepped rotation, as enabled by the atom interferometry being utilized, yields improved results with lower costs than what is achievable with some prior-art techniques.

5 Claims, 9 Drawing Sheets

ATOM-INTERFEROMETRIC, STEPPED GRAVITY GRADIENT MEASURING SYSTEM

FIELD OF THE INVENTION

The present invention relates to gravity gradiometers in general, and, more particularly, to a stepped gravity gradiometer system based on atom interferometry.

BACKGROUND OF THE INVENTION

Devices that can sense departures of their own reference frame from an "inertial reference frame" are of important practical and commercial use—for example, in the area of inertial navigation and guidance. A gravity gradiometer is one such device, which is used to measure the gradient of a gravitational field.

Some gradiometers in the prior art utilize a main sensing element. This sensing element is a metallic sphere with high-density weights located at opposite ends of a diameter. The sensing sphere or float is symmetric about this diameter. It is suspended both electrostatically and by a fluid within a hollow sphere, and is free to rotate inside. When a given mass is passed by the device, the mass pulls more on the nearer weight than on the farther. A torque is thereby exerted on the sensing sphere, and the device then exerts a counter torque just sufficient to stop the motion of the sphere. The amount of counter torque is determined by a feedback system that is calibrated to a source of electric current. Since the moments of inertia of the sensing sphere are precisely known and the counter torque is measured, the components of the gradient of the gravitational field can be inferred. This type of gradiometer, however, has its limitations which include lack of portability and rapidity.

Some other gradiometer systems in the prior art utilize an orthogonal triad of gradiometers, where each gradiometer is assigned to a different directional axis, is independently rotatable, and comprises multiple pairs of accelerometers. The accelerometer pairs that constitute a particular gradiometer are rotated around that gradiometer's axis. Any difference in the acceleration measurements between the accelerometers in a pair translates to a gravity gradient, and measurements from multiple pairs of accelerometers are combined to produce a gradiometer output. Each gradiometer of this configuration measures two of the five independent components of the total gradient tensor. Measurements from the three gradiometers are necessary to measure the entire gradient tensor.

From a hardware perspective, the gradiometer system described immediately above requires rotating six (or more) accelerometer pairs around three orthogonal axes, consequentially requiring multiple motors, bearings, and slip rings. Because of the complement of hardware required, it is relatively costly to engineer a low failure rate with high signal-to-noise performance for this type of gradiometer system. Additionally, the accelerometers that are utilized are typically under-damped, thereby making the gradiometers very fragile and sensitive to small disturbances in the rotation rate.

What is needed is a gradiometer system that is capable of detecting relatively small changes in a gravitational field, without some of the costs and other disadvantages in the prior art.

SUMMARY OF THE INVENTION

The present invention features a full-tensor, gravity gradient measuring system that is based on atom interferometry. Each axis in the three-axis measuring system is served by a different gravity gradiometer, where each gradiometer comprises three pairs of atom interferometric (AI) accelerometers. The accelerometers in each pair are mounted on opposite sides of the gradiometer's rotation axis from each other.

In order to take gradient measurements, the accelerometer pairs that constitute a gradiometer are rotated about the gradiometer's rotation axis. In accordance with the illustrative embodiment, the rotational motion is a stepping motion about the rotation axis, in which the accelerometer pairs are slewed and then stopped at a first position in order to take a gradient measurement. With its stepping motion, as enabled by the atom interferometry utilized, the illustrative embodiment is different from prior-art techniques that rely on conventional proof masses, for those proof masses in the prior art have to be rotated continuously and at a constant rate. From the first position, the accelerometer pairs can be slewed to one or more additional positions to take additional gradient measurements. The accelerometer pairs can then be slewed back to a neutral position in order to wait for subsequent commands.

The three gradiometers in the overall measuring system are mounted orthogonally with respect to one another on a stable, local-level platform, in order to achieve a full-tensor measuring system. In accordance with the illustrative embodiment, the three gradiometers are mounted in an orthogonal umbrella coordinate system on the local-level platform, where the measuring reference plane of each gradiometer is preferentially angled 35.26 degrees above the horizontal of the local-level. This ensures that all gradiometers experience a common component of the g-vector, thereby optimizing the operation of the AI-based accelerometer pairs. As with the individual gradiometers, the measuring system can be step-rotated as an overall unit around an axis perpendicular to the local level reference.

The atom interferometry that is featured in the illustrative embodiment is beneficial for various reasons. One benefit is the increased accuracy in the gradient measurements, which is based on the interference of atom waves within a formed, coherent atom cloud. The atom densities in the atom cloud yield extremely high signal-to-noise ratios during the measurements. Further in respect of the accuracy achieved, the use of an atomic proof mass, rather than a conventional proof mass, ensures the material properties between proof masses will be identical. Another benefit is the reduced cost and maintenance on account of the fewer moving parts within each gradiometer, relative to some systems in the prior art.

As enabled by atom interferometry, the stepped movement featured in the illustrative embodiment eliminates the need for the continuous rotation that is inherent in some techniques of the prior art. The stepped movement renders unnecessary the use of problematic slip rings for electrical contacts or of cables that can get twisted up. Additionally, because there are no springs that can continue to oscillate, a high slewing rate can be used to move the accelerometer pairs of each gradiometer from one orientation to the next. And because of the stepping manner in which each gradiometer, as well as the overall system, can be rotated and stopped for a measurement, various techniques for reducing noise, correcting alignment errors between the accelerometer pairs, and providing calibration across the gradiometers can be utilized.

The illustrative embodiment of the present invention comprises: a base mounted for rotary motion about a single axis which is perpendicular to a reference plane; a plurality of accelerometer pairs mounted upon the base, each of the accelerometer pairs having a measuring axis that is substantially parallel to the reference plane; and a motor for slewing the plurality of accelerometer pairs around the single axis from a first position to a second position so that each accelerometer pair is able to take a gravity gradient measurement along its measuring axis when the plurality is stopped at the second position.

DETAILED DESCRIPTION

Figure 1:
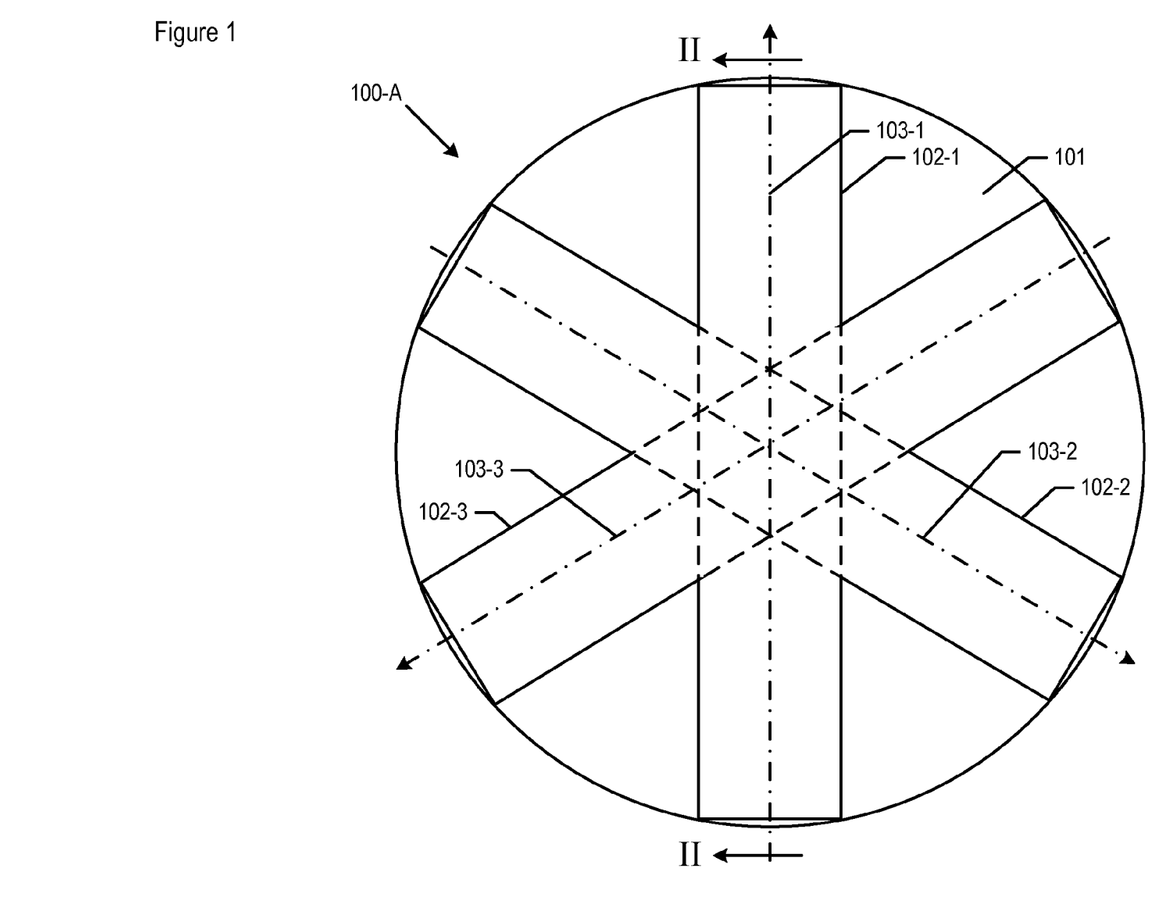
FIG. 1 depicts a top-plan view of gravity gradiometer 100-A in accordance with the illustrative embodiment of the present invention.

FIG. 1 depicts a top-plan view of gravity gradiometer 100-A, in accordance with the illustrative embodiment of the present invention. Gradiometers 100-A comprises base 101, which is an object to which multiple accelerometer pairs are attached. Although for purposes of clarity base 101 is depicted as a disc-shaped plate, the base can be shaped differently than depicted, as those who are skilled in the art will appreciate.

Gradiometer 100-A further comprises accelerometer pairs 102-1, 102-2, and 102-3 mounted upon base 101. Accelerometer pairs 102-1 through 102-3 are described in detail below and with respect to FIGS. 2 through 4. As shown in FIG. 1, each accelerometer pair 102-1 through 102-3 is capable of measuring a gravity gradient along measuring axis 103-1 through 103-3, respectively. Measuring axes 103-1 through 103-3 are oriented such that the measuring directions are spaced 120 degrees apart from one another.

Three accelerometer pairs are depicted in FIG. 1, in accordance with the illustrative embodiment of the present invention: accelerometer pairs 102-1 through 102-G, wherein G is equal to three. In some alternative embodiments, however, a different number of accelerometer pairs (i.e., a different value for G) can be used, as those who are skilled in the art will appreciate.

Figure 2:
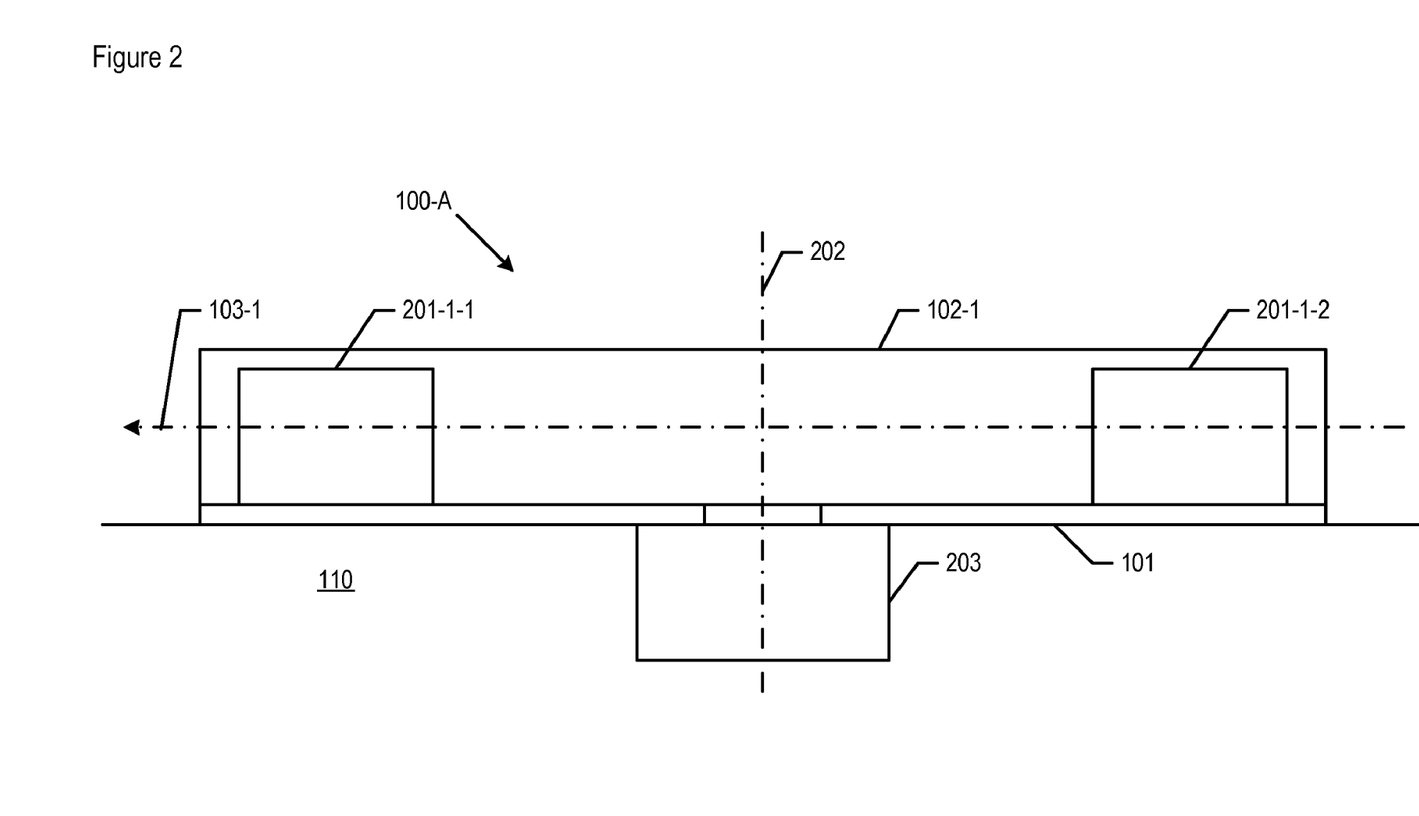
FIG. 2 depicts a cross-sectional view of gradiometer 100-A, as well as a cross-sectional view of accelerometer pair 102-1 of gradiometer 100-A, taken along line II-II of FIG. 1.

FIG. 2 depicts a cross-sectional view of gradiometer 100-A, as well as a cross-sectional view of accelerometer pair 102-1. In addition to accelerometer pairs 102-1 through 102-3 and base 101, gradiometer 100-A also comprises slewing motor 203, to which base 101 is rotatably coupled. Motor 203 rests upon or within structure 110 which, in turn, may be mounted upon or within the host system that takes the accelerometer pair measurements, such as framework 501 that is described below and with respect to FIG. 5. Motor 203 enables base 101 to achieve rotary motion about axis 202, which is perpendicular to a reference plane that is parallel to axis 103-1. In accordance with the illustrative embodiment, motor 203 slews base 101, as well as the accelerometer pairs mounted upon the base, to various positions for the purpose of obtaining gravity gradient measurements when the base stops at each position. In some embodiments, motor 203 is further capable of slewing base 101 back to a neutral position when gradiometer 100-A is not in use, or between measurements. It is this motion of slewing to a first position and stopping for a measurement, slewing to a second position and stopping for a measurement, and so forth that is referred to as "stepping" motion. The stepping motion is one of the characteristics of the illustrative embodiment that distinguishes it from prior-art systems that require continuously rotational motion.

Each accelerometer pair 102-g, wherein g in the illustrative embodiment has a value between one and three, inclusive, comprises accelerometers 201-g-1 and 201-g-2 that can be spaced, for example, roughly 10 to 20 centimeters apart, the exact spacing being determined in well-known fashion. The accelerometers are mounted on opposite sides of rotation axis 202 from each other, at the same distance from the rotation axis as each other. Together, each pair of accelerometers constitutes a accelerometer pair that is capable of providing a measurement of a gravity gradient along a measuring axis 103-g, which is substantially parallel to the reference plane that is perpendicular to axis 202.

Figure 3:
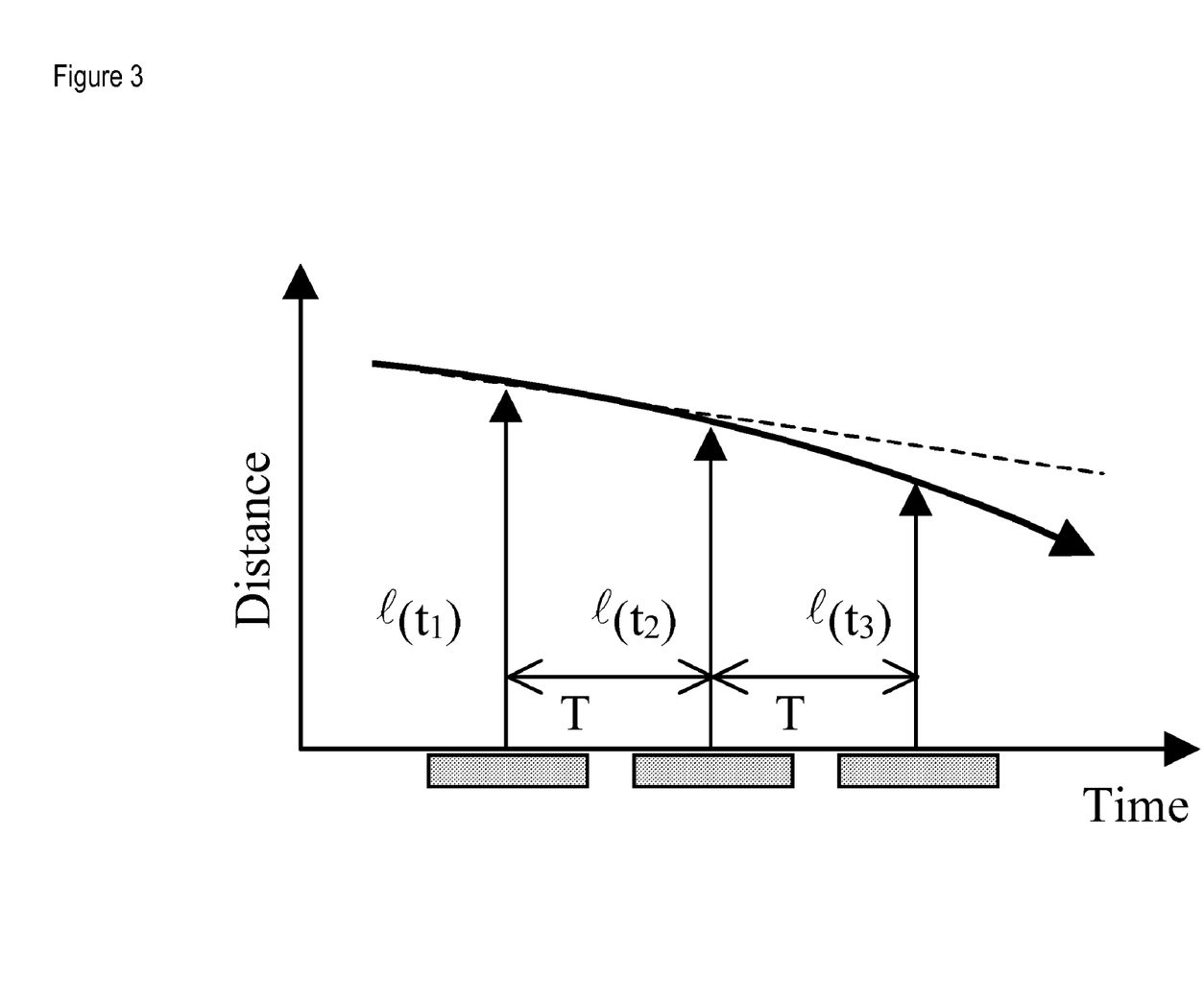
FIG. 3 depicts displacement measurements of a proof mass's trajectory that are required to determine the acceleration of the proof mass.

In accordance with the illustrative embodiment, each accelerometer 201-g-h, wherein h has a value of one or two, is a measuring device that is based upon atom interferometric (AI) technology, as is known in the art. AI-based devices apply the science of coherent atom-laser interactions to make sensitive and accurate measurements of the trajectories of ensembles of atoms, in order to determine acceleration. A classical analogy for the AI acceleration measurement is to consider measuring the trajectory of a proof mass in an accelerating reference frame. As depicted in FIG. 3, displacement measurements of the proof mass trajectory are required to determine the acceleration, a, of the proof mass:

$$a=[l(t_1)-2l(t_2)+l(t_3)]/T^2 \qquad \text{(Equation 1)}$$

wherein T is the interval between successive measurements, and $l(t_j)$ is the measured displacement at time j.

Figure 4:
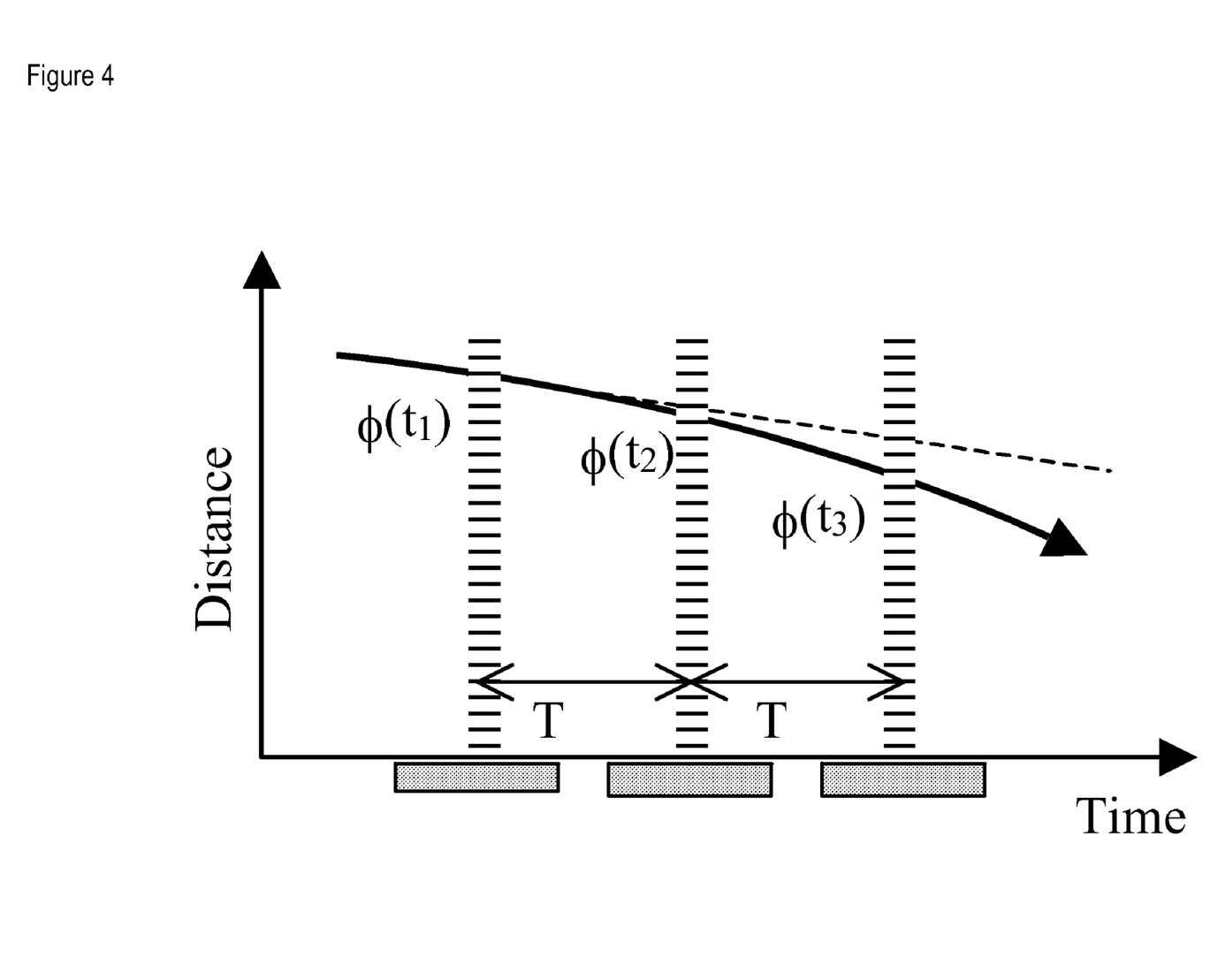
FIG. 4 depicts the operations of an atom interferometric accelerometer of the illustrative embodiment.

As depicted in FIG. 4, an atom-interferometric accelerometer essentially operates by replacing the proof mass with atoms and measuring the atom trajectory through three successive interactions with laser beams, namely $\phi(t_1)$, $\phi(t_2)$, and $\phi(t_3)$, separated by interval T. The atoms situated in an entity known as an "atom cloud." In order to create its atom cloud, accelerometer 201-g-h applies Magneto-Optic Trapping (MOT) and cooling technology, as is known in the art. The atom cloud is released (i.e., dropped or launched), and effectively becomes a reference point in space. During the atom cloud's free fall, a measuring laser (e.g., Raman laser, etc.) is used to measure the accelerometer's motion relative to the atom cloud. In accordance with the illustrative embodiment, a single measuring laser is used to measure the motion of the two accelerometers that constitute a accelerometer pair. In some alternative embodiments, each accelerometer can associated with its own, dedicated measuring laser.

The gravity gradient measurement subsequently generated by accelerometer pair 102-g is based on the difference between the acceleration measurements taken by accelerometers 201-g-1 and 201-g-2.

Figure 5:
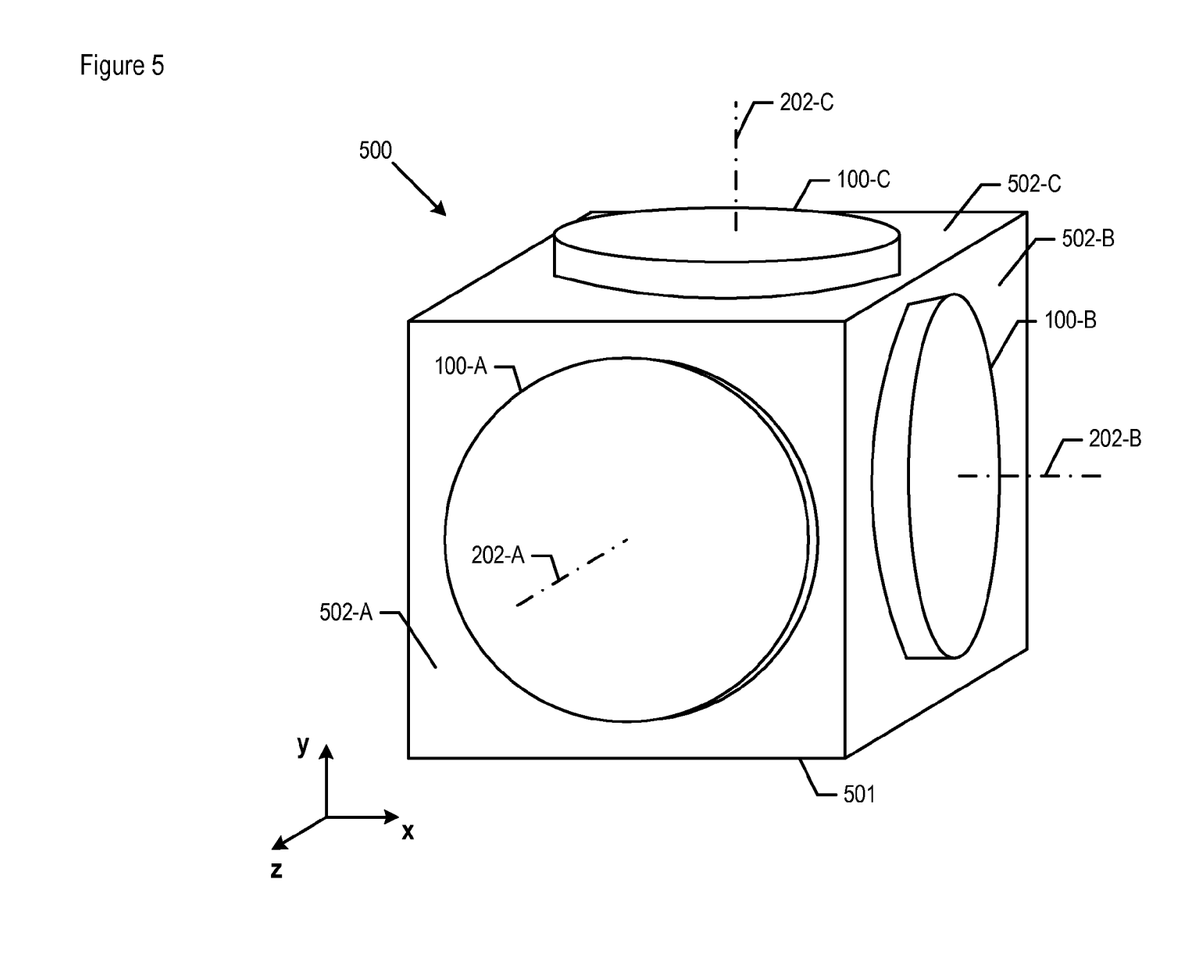
FIG. 5 depicts gravity gradient measuring system 500 comprising gradiometers 100-A, 100-B, and 100-C, in accordance with the illustrative embodiment of the present invention.

FIG. 5 depicts gravity gradient measuring system 500, in accordance with the illustrative embodiment of the present invention. System 500 comprises gravity gradiometer 100-A and two additional gravity gradiometer, which are labeled as gradiometer 100-B and 100-C, as well as framework 501. Gravity gradiometers 100-B and 100-C are identical to gradiometer 100-A, except in their orthogonal mounting orientations on unit 501. Framework 501 represents a structure for supporting and/or enclosing gradiometers 100-A through 100-C. Although for pedagogical reasons framework 501 is depicted as a simple cube shape, it will be clear to those skilled in the art how to make and use measuring system 500 based on another orthogonal mounting configuration.

As depicted, gradiometer 100-A is mounted along reference plane 502-A of framework 501, gradiometer 100-B is mounted along reference plane 502-B, and gradiometer 100-C is mounted along reference plane 502-C. As described earlier, gradiometer 100-A comprises a base that is able to rotate about axis 202-A, which is perpendicular to reference plane 502-A. Similarly, gradiometer 100-B comprises a base that is able to rotate about axis 202-B, which is perpendicular to reference plane 502-B, and gradiometer 100-C comprises a base that is able to rotate about axis 202-C, which is perpendicular to reference plane 502-C. The three reference planes area substantially orthogonal to one another. In this way, the combined accelerometer pairs that constitute gradiometers 100-A, 100-B, and 100-C are able to make gradient measurements in any direction in three-dimensional space (i.e., defined by the x-, y-, and z-axis).

In some alternative embodiments, as those who are skilled in the art will appreciate, a single gradiometer 100-A can be used to make measurements along a reference plane that is perpendicular to the x-axis, then can be re-positioned to make measurements along a reference plane that is perpendicular to the y-axis, and then can be re-positioned to make measurements along a reference plane that is perpendicular to the z-axis. In this way, the need to have three physically distinct gravity gradiometers can be eliminated, thereby reducing cost.

Figure 6:
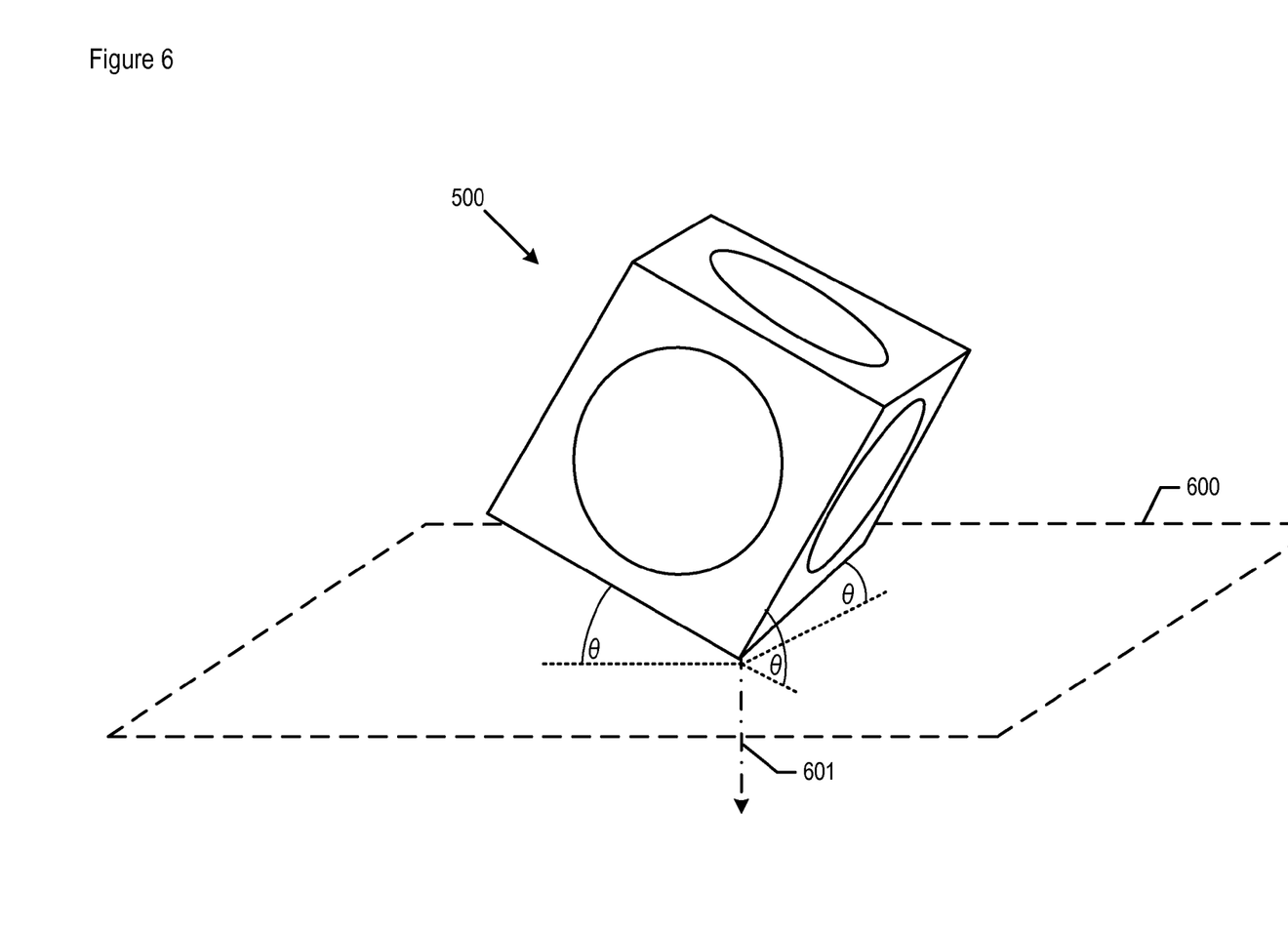
FIG. 6 depicts an orientation of the three gravity gradiometers 100-A, 100-B, and 100-C in relation to a local level.

As depicted in FIG. 6, the three gravity gradiometers 100-A, 100-B, and 100-C are oriented so that the angle of each of reference planes 502-A, 502-B, and 502-C is at a predetermined angle with respect to local-level reference 600 that is perpendicular to reference gravity vector 601 (i.e., the g-vector) pointing to the Earth's center. This is indicated by the same angle θ applying to the three orthogonal edges of system 500 that share the same vertex. In accordance with the illustrative embodiment, the predetermined angle is 35.26 degrees, which is the angle at which the free-fall time of an atom being measured is optimized across all three gradiometers. In some alternative embodiments, another angular value or tolerance might be used (e.g., between 35 and 36 degrees, between 30 and 40 degrees, etc.). And in some other alternative embodiments, it might be more desirable to arrange the gravity gradiometers at angles which will emphasize one axis over the others.

By having three accelerometer pairs arranged in the depicted configuration, gradiometer 100-A is capable of providing three gradient outputs: $T_{xx}$, $T_{xy}$, and $T_{yy}$. As those who are skilled in the art will appreciate, these three outputs yield two partial tensors, $(T_{xx}-T_{yy})/2$ and $T_{xy}$. Similarly, gradiometer 100-B is capable of yielding the two partial tensors $(T_{yy}-T_{zz})/2$ and $T_{yz}$, and gradiometer 100-C is capable of yielding the two partial tensors $(T_{zz}-T_{xx})/2$ and $T_{zx}$. In this way, a full gravity gradient tensor can be ultimately obtained. Note that $T_{xx}$, $T_{yy}$, and $T_{zz}$ correspond to the change in acceleration along the x, y, and z direction, respectively.

In some embodiments, measuring system 500 further comprises a motor for slewing framework 501 around g-vector axis 601, in which framework 501 is rotatably coupled to a local-level platform that provides local-level reference 600.

Figure 7:
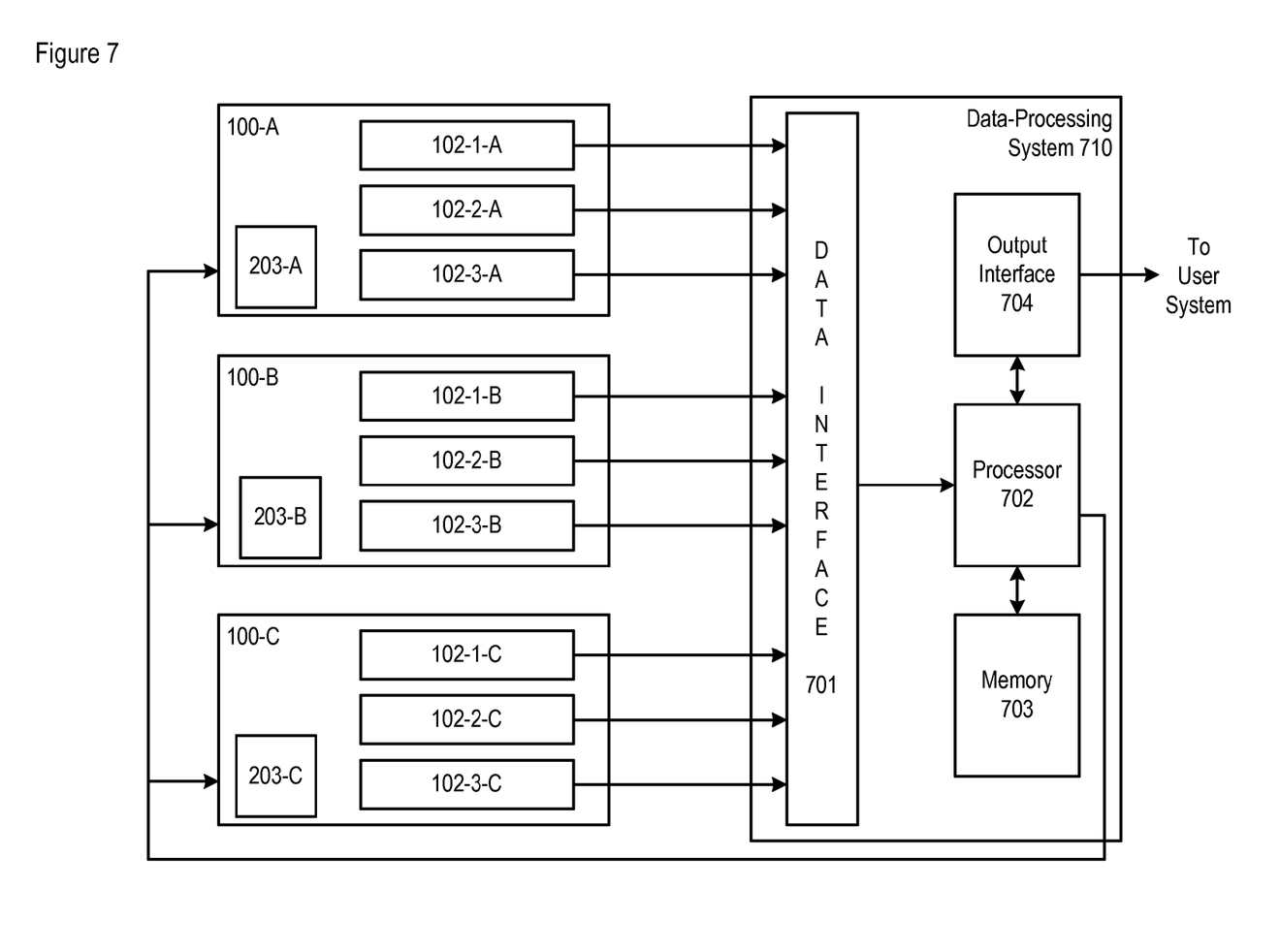
FIG. 7 depicts a schematic diagram of a circuit 700 that is used to operate gravity gradient measuring system 500, in accordance with the illustrative embodiment of the present invention.

FIG. 7 depicts a schematic diagram of a circuit 700 that is used to operate gravity gradient measuring system 500, in accordance with the illustrative embodiment of the present invention. Circuit 700 comprises gradiometers 100-A, 100-B, and 100-C, as well as data-processing system 710.

Data-processing system 710 receives gradiometer input from the accelerometer pairs of each of gradiometer 100-A through 100-C, and provides control signals back to those accelerometer pairs, as well as to motors 203-A, 203-B, and 203-C. System 710 comprises gradiometer data interface 701, processor 702, memory 703, and gradient output interface 704, interconnected as shown. It will be clear to those skilled in the art, after reading this disclosure, how to make and use alternative embodiments of the present invention in which system 710 comprises any subcombination of the components listed above.

Gradiometer data interface 701 comprises the circuitry that enables system 710 to receive signals from the accelerometer pairs of each of gradiometers 100-A through 100-C.

Processor 702 is a general-purpose processor that is capable of receiving information from and transmitting information to interface 701, of executing instructions stored in memory 703 including those that correspond to the tasks of the illustrative embodiment, and of reading data from and writing data into memory 703. In some alternative embodiments of the present invention, processor 702 might be a special-purpose processor. Processor 702 also provides control signals back to the accelerometer pairs (e.g., signals that control the atom interferometry, etc.), as well as to motors 203-A, 203-B, and 203-C (e.g., signals that control the stepping motion, etc.).

Memory 703 stores the instructions and data used by processor 702, in well-known fashion. Memory 703 can be any combination of dynamic random-access memory (RAM), flash memory, disk drive memory, and so forth.

Gradient output interface 704 comprises the circuitry that enables system 710 to transmit signals to a user system of the gravity gradient data being measured, such as a display device.

Figure 8:
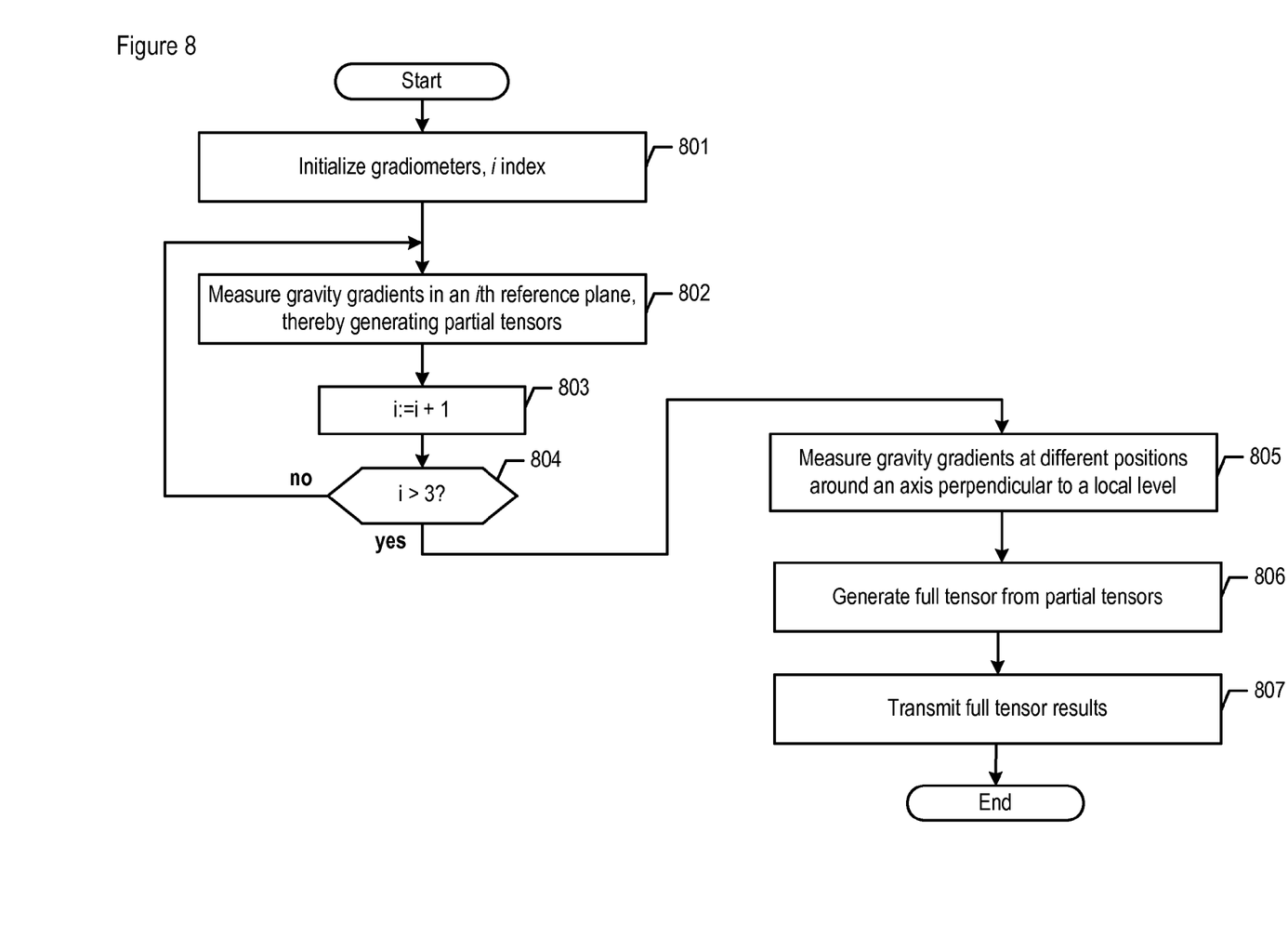
FIG. 8 depicts a first flow diagram of the salient tasks performed by data-processing system 710, in accordance with the illustrative embodiment of the present invention.
Figure 9:
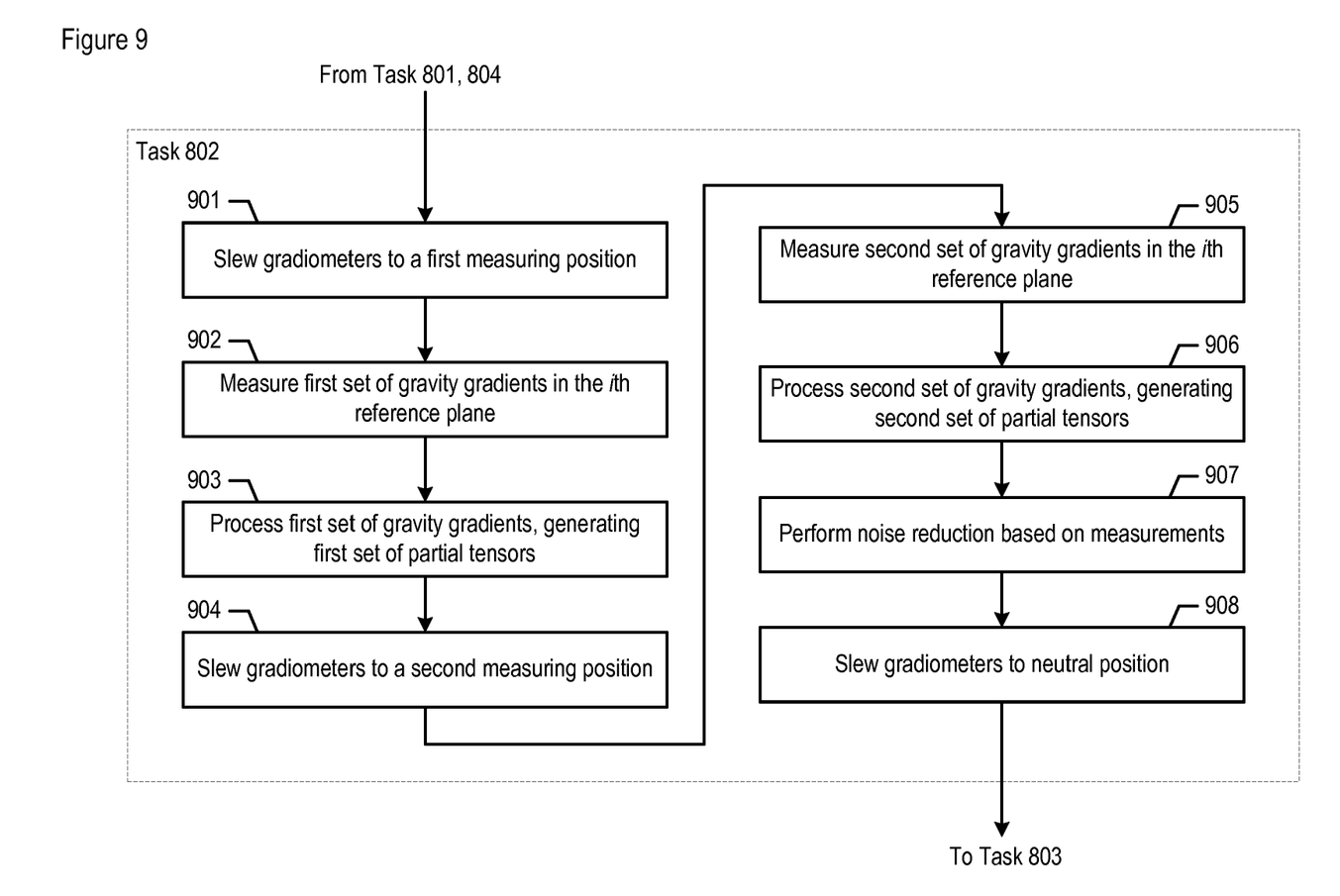
FIG. 9 depicts a second flow diagram of the salient tasks performed by data-processing system 710.

FIGS. 8 and 9 depict flow diagrams of the salient tasks performed by data-processing system 710, in accordance with the illustrative embodiment of the present invention. As those who are skilled in the art will appreciate, at least some of the depicted tasks in FIG. 8 or 9, or both, can be performed simultaneously or in a different order from that depicted.

At task 801, system 710 instructs accelerometer pairs 102-1, 102-2, and 102-3 within each of gradiometers 100-A through 100-C to initialize. This involves creating a coherent cloud of super-cooled cesium atoms within each accelerometer of each accelerometer pair. The atoms are first Doppler-cooled to just above absolute zero. An orthogonal set of magnetic fields are then used to trap the cooled atoms, creating an "atomic cloud."

At this point, system 710 initializes the index i that is used for coordinating the measurement process.

At task 802, system 710 instructs the appropriate subset of accelerometer pairs to measure the gravity gradients in the ith reference plane (i.e., plane 502-A, 502-B, or 502-C). The specific tasks that are related to the measuring process are described below and with respect to FIG. 9. Although for pedagogical reasons the measuring of the reference planes are represented as being performed serially, it will be clear to those skilled in the art how to perform them in parallel.

At task 803, system 710 increments index i.

At task 804, system 710 checks if gradient measurements for all three reference planes have been made. If so, task execution proceeds to task 805; otherwise, task execution proceeds back to task 802.

At task 805, in some embodiments, system 710 slews framework 501 around axis 601 to one or more additional measuring positions and measures additional gravity gradients after the framework is stopped at each of those positions. Essentially, at task 805 system 710 repeats some or all of tasks 801 through 804 at each measuring position around axis 601.

At task 806, system 710 generates a full tensor from the partial tensors obtained within task 802, in well-known fashion. In some embodiments, system 710 refines the full-tensor result with the additional partial tensors obtained as a result of the additional measurements taken at task 805.

At task 807, system 710 transmits the full-tensor results obtained at task 806.

After task 807, execution of the tasks depicted in FIG. 8 can then be repeated continually, either periodically or sporadically.

FIG. 9 specifically depicts the use of the AI-based accelerometer pairs, in accordance with the illustrative embodiment of the present invention. Referring to FIG. 9, at task 901, accelerometer pairs 102-1 through 102-3 of gravity gradiometer 100-A, 100-B, or 100-C are slewed to a first measuring position and then stopped. Advantageously, a high slew rate can be used to move the accelerometer pairs between orientations, thereby speeding up the measuring process. Because the accelerometer pairs are based on atomic interferometry, they operate with a duty cycle of slewing, stopping, and measuring, which eliminates the need for continuous rotation. Because continuous rotation is not necessary, the requirement for slip rings is also eliminated for the electrical contacts between rotating base 101 and its base, for each of gradiometers 100-A through 100-C.

At task 902, accelerometer pairs 102-1 through 102-3 measure a first set of gravity gradients in a first reference plane. This is accomplished by first turning off the cooling lasers and the magnetic fields in each accelerometer pair, allowing the atom cloud to free fall. Another laser (e.g., a Raman laser, etc.) is used to pulse the atom cloud three times during free fall, as described above and with respect to FIG. 4.

At task 903, data-processing system 710 receives gradiometer data from the accelerometer pairs and generates a first set of partial tensors. For example, if the accelerometer pairs measure gravity gradients in the x-y reference plane, the partial tensors generated are $T_{xx}$, $T_{xy}$, and $T_{yy}$.

At task 904, accelerometer pairs 102-1 through 102-3 are slewed to a second measuring position and then stopped.

At task 905, accelerometer pairs 102-1 through 102-2 measure a second set of gravity gradients in the reference plane.

At task 906, data-processing system 710 receives gradiometer data from the accelerometer pairs and generates a second set of partial tensors. For example, if the accelerometer pairs measure gravity gradients in the x-y reference plane, the partial tensors generated are $T_{xx}$, $T_{xy}$, and $T_{yy}$.

At task 907, data-processing system 710 can also perform calibration, including noise reduction, based on multiple sets of partial tensors. The gradient measuring technique of the illustrative embodiment enables the cancellation or reduction of different types of noise. In a first example of how multiple measurements can be used, each accelerometer pair (e.g., accelerometer pair 102-1, etc.) within a given gradiometer (e.g., gradiometer 100-A, etc.) can take a gradient measurement at a first bearing and then take a gradient measurement at a second bearing shortly thereafter, where the second bearing is 180 degrees different from the first. Once the directional component is compensated for and the large gradient component is cancelled out, any discrepancy between the two measurements can be attributed to sensor or alignment differences between the two accelerometers that make up the accelerometer pair.

As another example of how multiple measurements can be used, in a technique called "delayed differencing," each plurality of accelerometer pairs can be rotated at a particular rate, such as one rotation per second. Accelerometer pair 102-1, then 102-2, then 102-3 can each take a gradient measurement at the same bearing, but at different times (e.g., 0.33 seconds apart). Since the actual gravity gradient does not change that fast, the delayed differencing has the effect of canceling out any large gradient component. Noise is, therefore, what remains as any discrepancy between the measurements across the accelerometer pairs. The difference in noise or impedance (e.g., differences across electronic sensor components, etc.) between any two accelerometer pairs thereby can be ascertained and subsequently compensated for. As those who are skilled in the art will appreciate, the delayed differencing can be performed at different rotation rates, in order to assess noise that occurs at different frequencies.

The system of the illustrative embodiment also enables the correction of mounting alignment errors across gradiometers 100-A, 100-B, and 100C. This can be accomplished by measuring the difference between gradiometers over time because the linear acceleration for a given bearing should ideally be the same between one gradiometer (e.g., 100-A, etc.) measuring along the bearing and another gradiometer (e.g., 100-B, etc.) measuring across the same bearing.

Although FIG. 9 depicts slewing to and taking measurements at two positions, the accelerometer pairs can take measurements at additional positions, as part of the same sequence of measurements, as those who are skilled in the art will appreciate.

At task 908, in some embodiments, accelerometer pairs 102-1 through 102-3 are slewed to a neutral position. Slewing back to the neutral position can be performed for stowing the accelerometer pairs, for "untwisting" the control and data wiring, or for other reasons.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
 a base mounted for rotary motion about a single axis which is perpendicular to a reference plane;
 a plurality of accelerometer pairs mounted upon the base, each of the accelerometer pairs having a measuring axis that is substantially parallel to the reference plane, wherein each accelerometer pair comprises means for measuring acceleration that is based on atom interferometry, and wherein each accelerometer pair comprises a pair of atom clouds, each comprising a proof mass, such that the atom clouds in each pair are maintained on opposite sides of the single axis; and
 a motor for slewing the plurality of accelerometer pairs around the single axis from a first position to a second position so that each accelerometer pair is able to take a gravity gradient measurement along its measuring axis when the plurality is stopped at the second position.

2. The apparatus of claim 1 wherein the plurality of accelerometer pairs comprises three accelerometer pairs with measuring axes that are 120 degrees angularly apart from one another.

3. The apparatus of claim 2 further comprising:

signal generation means connected to each accelerometer pair in the plurality, the signal generation means being capable of generating signals that represent the gravity gradients measured by the accelerometer pairs; and processing circuit means for processing the generated signals, the processing circuit means being capable of generating two partial tensor outputs that correspond to the reference plane.

4. The apparatus of claim 1 further comprising means for aligning the single axis to any of a first direction, second direction, or third direction, wherein the first, second, and third directions are substantially orthogonal with respect to one another.

5. The apparatus of claim 4 wherein the first, second, and third directions are at substantially 35.26 degrees relative to the direction of a vector that is perpendicular to a local level.

* * * * *